Oct. 21, 1952  T. B. DARLINGTON  2,614,426
LIQUID LEVEL GAUGE
Filed April 7, 1950

INVENTOR
Thomas B. Darlington
BY
Ralph T. French
ATTORNEY

Patented Oct. 21, 1952

2,614,426

UNITED STATES PATENT OFFICE 2,614,426

LIQUID LEVEL GAUGE

Thomas B. Darlington, Lansdowne, Pa., assignor to Westinghouse Electric Corporation, East Pittsburgh, Pa., a corporation of Pennsylvania Application April 7, 1950, Serial No. 154,578

5 Claims. (Cl. 73—290)

This invention relates to liquid level indicating apparatus, and has for an object the provision of an improved liquid level gauge device particularly suitable for association with the lower wall of a reservoir.

In the installation of a power plant in the frame of an aircraft, it may be desirable to mount an oil reservoir on a lower wall of the casing of the apparatus, so that a level indicator or dip stick requiring access to the top of the reservoir cannot conveniently be employed as a means for measuring the quantity of oil therein. It is another object of this invention to provide an indicator device facilitating the measurement of the oil level from a point below an underslung oil reservoir carried by a power plant, such as an aviation gas turbine engine.

A further object of the invention is to provide a liquid level indicator including a bottom mounted casing having a tubular portion extending from the lower wall of the reservoir to a point above the level of the liquid therein, and a removable gauge tube adapted to indicate the liquid level and arranged to be withdrawn from the casing for inspection from a point beneath the reservoir.

Another object is the provision of an indicator device of the above description including suitable sealing means for preventing loss of liquid when the gauge tube is withdrawn from the reservoir.

These and other objects are effected by my invention as will be apparent from the following description and claims taken in connection with the accompanying drawings, forming a part of this application, in which:

Figure 1:
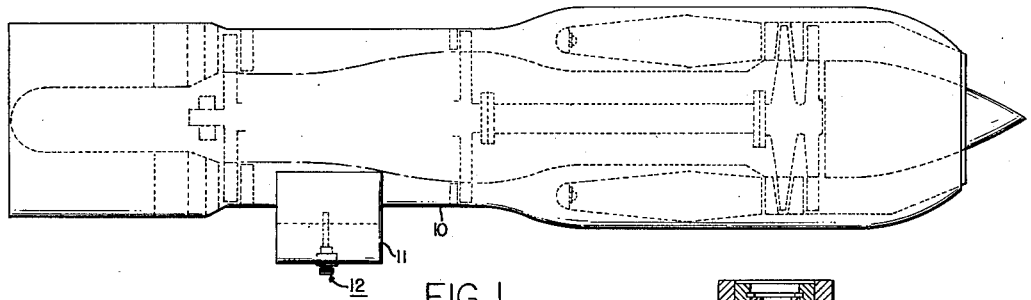
Fig. 1 is a schematic elevational view of a typical aviation turbojet power plant equipped with an underslung oil reservoir and gauge assembly embodying the invention.

Referring to Fig. 1, a gas turbine power plant 10 of conventional construction adapted for installation in or on the frame or wing of an aircraft (not shown), may be equipped with an underslung oil reservoir 11, which may constitute a part of the usual lubricating and hydraulic servomotor system (not shown) of the power plant. With the reservoir 11 thus carried beneath the power plant, the use of an ordinary oil level gauge such as the well-known dip-stick, requiring access to the top of the reservoir, is rendered impracticable. According to the invention, however, the bottom wall of the reservoir 11 is adapted to carry a level indicator or gauge assembly 12, which includes a gauge element that may readily be withdrawn downwardly for inspection, without loss of oil from the reservoir or from the gauge element itself.

Figures 2, 3, 4:
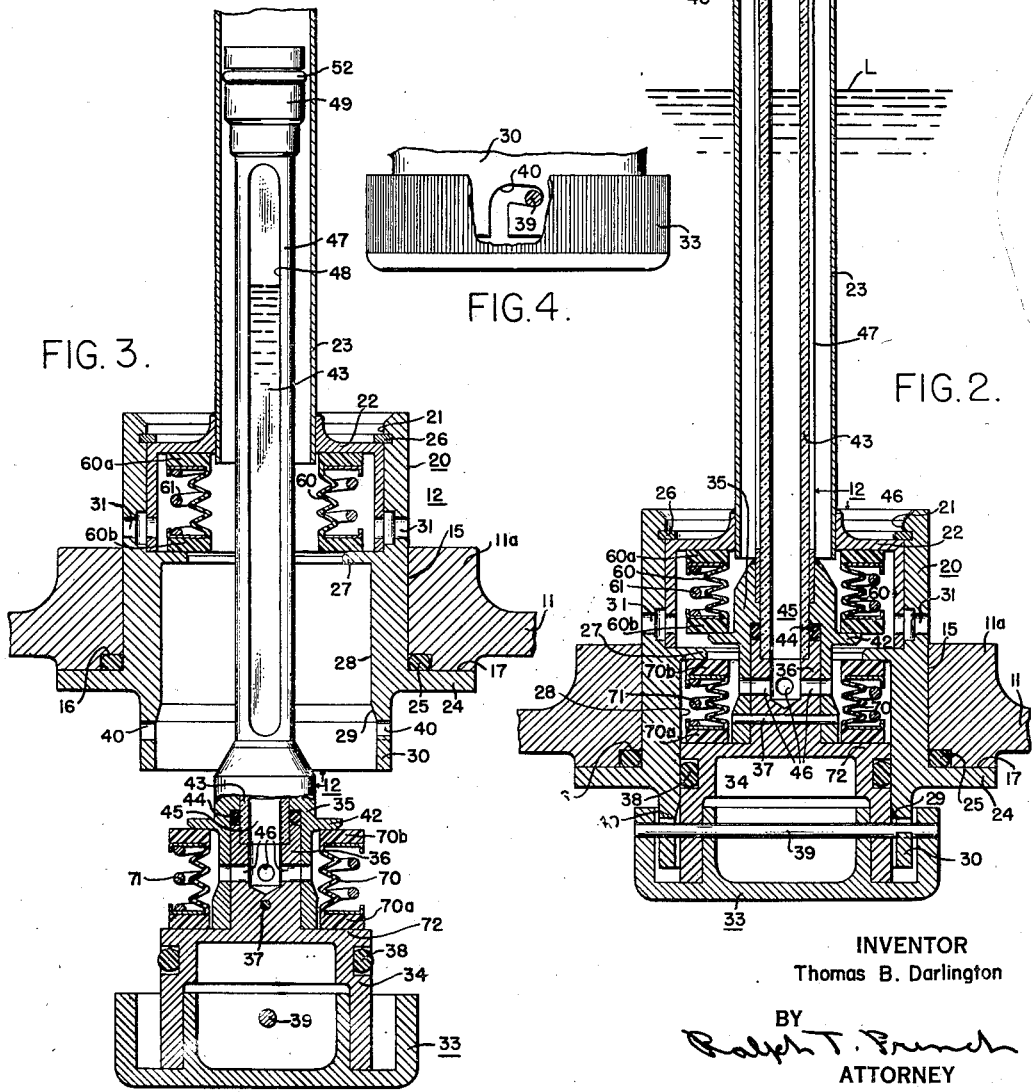
Fig. 2 is a vertical sectional view, in enlarged detail, of a liquid level indicator or gauge assembly constructed in accordance with the invention and adapted for use with the reservoir and apparatus shown in Fig. 1.
Fig. 3 is a sectional view of the same device, with the removable gauge or plug member partly withdrawn and rotated ninety degrees with respect to the position thereof illustrated in Fig. 2.
Fig. 4 is a fragmentary elevational view of the removable plug member of the gauge assembly, showing means for connecting the member to the stationary casing.

As best shown in Fig. 2 of the drawing, the lower wall 11a of the oil reservoir 11 has formed therein a vertical bore 15 terminating in a counterbore 16 adjacent an exterior bolting face 17, for receiving the oil level gauge assembly generally indicated at 12. The gauge assembly 12 comprises a cylindrical casing 20 having an axial bore 21 closed at the upper end by a concentrically fitted annular cup section 22 which is welded to the lower open end of an axially extending tubular well section 23, the upper end of which projects beyond the normal level of oil, indicated at L, in Fig. 2, contained in the reservoir 11. An annular flange 24 of the casing 20 engages the bolting face 17 of the reservoir 11 for facilitating the mounting of the casing on the bottom of the reservoir with a gasket 25 interposed in the counterbore 16 for ensuring a tight joint. A snap ring 26 is fitted into a suitable groove of the casing 20 for retaining the cup section 22. The lower annular edge of the cup section 22 rests on a shoulder adjacent an interior annular seat rib 27 which is formed on the casing 20 intermediate the bore 21 and a coaxial bore 28, the lower end of which tapers outwardly to form the inner surface 29 of a flange 30 formed on the casing below the bolting flange 24. A number of lateral oil inlet openings or ports 31 are formed in side walls of the casing 20 and inner cup section 22, for admitting oil from the reservoir to the space within the casing.

The gauge assembly 12 further comprises a removable plug unit or member generally indicated at 33, including an enlarged base section 34 and a cap section 35 secured in telescoped relation on a central post portion 36 of the base section by means of a laterally disposed pin 37. The base section 34 carries an annular gasket or O-ring 38 and is adapted to be slidably engaged in the bore 28 of the casing 20, a transversely extending pin 39 being carried on an outer handle-end of the plug unit 33 for interlocking engagement with suitable slots 40 formed in the flange 30, as best shown in Fig. 4. Formed on the cap section 35 intermediate the ends thereof is an outwardly projecting annular seat flange or collar 42, having a peripheral diameter less than that of the opening in seat rib 27. Like the seat rib 27, the seat collar 42 is provided with flat, parallel upper and lower surfaces. With the plug unit 33 in its assembled position as shown in Fig. 2, the seat collar 42 is disposed above the top plane of the stationary seat rib 27, to form an annular oil receiving space or chamber communicating with inlet passages 31.

Mounted on the plug unit 33 is an axially extending translucent gauge tube 43, which is of sufficient length to project beyond the level of oil normally contained in the reservoir 11, with the plug unit secured to the casing 20, as shown in Fig. 2. The gauge tube 43 may be made of any suitable transparent material, preferably heat resistant glass adapted to withstand high temperatures encountered during operation of the power plant which is equipped with the reservoir 11. The lower end of the gauge tube 43 is sealed in a suitable bore formed in the interlocked cap section 35 and base section 34 of the plug unit 33, sealing means such as an O-ring or gasket 44 being interposed between these sections and the tube for providing a tight joint. The space 45 within the gauge tube communicates with a plurality of oil admission ports 46 which are formed in the plug unit 33 below seat collar 42. For protecting the tube 43 and to assist in holding it in coaxial relation with the plug unit 33, a tubular shield 47 having longitudinal slots 48 is mounted in encasing relation therewith, the lower end of the shield being welded to the cap section 35. The upper end of the shield 46 carries an annular seal member 49, which is engageable in an upper annular cap portion 50 of the tubular well section 23. An inner O-ring 51 is disposed in a groove in the seal member 49 for sealing the adjacent end of the glass tube 43. An outer O-ring 52 is also mounted in an exterior groove in the seal member for engagement with the cap portion 50. It will be noted that the upper end of passage 45 of the glass gauge tube 43 is thus maintained open to the interior of the reservoir 11, above the oil level, when the apparatus is positioned as shown in Fig. 2.

For preventing escape of oil from the reservoir upon withdrawal of the plug unit 33 from the casing 20, an annular flexible valve or sealing diaphragm 60 is concentrically disposed in the upper part of the casing. The sealing diaphragm 60 is preferably formed of a suitable oil resistant rubber-like composition, and comprises parallel sealing pads 60a and 60b joined by an annular bellows or web portion. A coil spring 61 is interposed between suitable washers engaging the sealing pads for holding the pad 60a in engagement with the end wall of the cup member 22 while urging the pad 60b downwardly toward the seat rib 27 of the casing. The outer margin of the sealing pad 60b is adapted to engage the seat rib 27 upon lowering of the removable plug unit 33, thereby in effect closing the inlet ports 31 for preventing leakage of oil from the reservoir. The inner margin of the sealing pad 60b is concentrically aligned with the seat collar 42 of the plug unit, however, so that upon assembly of the apparatus, the collar will seal against the sealing pad and hold it out of contact with the outer seat rib 27, as shown in Fig. 2.

A similar annular valve or sealing diaphragm 70 is mounted concentrically on the plug unit 33, comprising a flexible web portion terminating in parallel annular sealing pads 70a and 70b, which are urged apart by a surrounding coil spring 71. The lower sealing pad 70a abuts a shoulder 72 formed on the base section 34 of the plug unit, and the sealing pad 70b is cooperatively aligned with the seat collar 42 and also with the stationary seat rib 27 through the opening in which the seat collar is inserted upon application of the plug unit 33 to the casing 20, as already explained.

It will thus be seen that when the gauge tube 43 is inserted in the cylindrical well section 23 and the plug unit 33 engaged in the casing 20, the various elements of the indicator assembly 12 are disposed as shown in Fig. 2, for permitting oil in the gauge tube to assume the same level as that of oil in the reservoir 11. With the seat collar 42 of the plug unit 33 positioned above the stationary seat rib 27, an oil flow communication is maintained between the interior of the reservoir and the space 45 in the gauge tube, by way of the inlet openings 31, the annular space defined between the seat rib and seat collar, and the ports 46 in the plug unit 33. The sealing diaphragm 60 is engaged by the seat collar 42 to prevent access of oil to the space between the gauge tube 43 and tubular section 23, while the sealing pad 70b of diaphragm 70 engages the seat rib 27 to prevent leakage by way of the bore 28 of the casing.

When it is desired to inspect the oil level gauge tube, the plug unit 33 may be disengaged and lowered axially away from the casing 20, as illustrated in Fig. 3. During initial downward movement of the plug unit, the seat collar 42 leaves the sealing pad 60b upon engagement thereof with the outer seat rib 27 to cut off flow of oil by way of the inlet communications 31. As the seat collar 42 enters the opening defined by the seat rib 27 and engages the seat pad 70b of the lower sealing diaphragm or valve 70, the latter is thus rendered effective to close the ports 46 for retaining the oil in the gauge tube 43 at the level corresponding to that in the reservoir 11. It will be apparent that suitable indicia may be provided on the gauge tube 43 or shield 46 to facilitate the reading of the oil level. Following inspection, the gauge tube may readily be reinserted and the plug unit 33 again locked in place.

From the foregoing it will now be apparent that an improved gauge assembly constructed in accordance with the invention may be located in a conveniently accessible position for affording accurate indication of the oil level, the underslung features of construction being particularly useful in connection with aviation power plant installations necessitating conservation of space. When the removable plug unit of the gauge assembly is withdrawn, the valve or sealing elements effectively prevent loss of oil from the tank and trap oil in the gauge tube for inspection. Since both valve elements operate simultaneously, no oil is spilled regardless of how slowly the gauge tube is withdrawn, except for the negligible amount of oil trapped between the annular flanges 42 and 27. Since the relatively few component elements of the gauge apparatus may be assembled without observation of close tolerances, and since the various sealing members may constitute commercially available stock items, the gauge assembly may be economically employed either with existing equipment, or for power plants of advanced design.

While I have shown the invention in but one form, it will be obvious to those skilled in the art that it is not so limited, but is susceptible of various changes and modifications without departing from the spirit thereof.

What I claim is:

1. Liquid level indicator apparatus comprising a generally cylindrical casing having a vertical axis and adapted to be mounted in an aperture in the bottom wall of a reservoir, said casing having a chamber and an entryway for admitting liquid thereto from the reservoir, an interior annular seat rib coaxially carried on said casing within said chamber and below said entryway, a vertically disposed tubular member carried in said casing with the lower end thereof open to said chamber and the upper end thereof open above the maximum level of liquid in the reservoir, an axially removable plug member detachably engaging in a lower portion of said casing and having an annular collar slightly smaller in peripheral diameter than the inner diameter of said seat rib, said collar being concentrically disposed slightly above said seat rib when the plug member is attached to the casing, a translucent gauge tube having openings in both ends and having one end coaxially mounted on said plug member, the opposite open end of said gauge tube being engaged in the upper end of said tubular member upon assembly of the plug member and casing, a downwardly biased flexible annular sealing element concentrically mounted in said casing for cooperation with said seat rib to cut off communication through said entryway, said sealing element being moved away from said seat rib by said collar upon attachment of said plug member to said casing, and another flexible annular sealing element carried by said plug member and biased upwardly toward concentric sealing engagement with said collar thereof for closing the adjacent lower end of said gauge tube, the last-named sealing element being moved away from said collar by engagement with said seat rib when said plug member is attached to said casing.

2. A liquid level indicator assembly comprising casing structure having a bottom opening and carrying an upright tubular portion having a height in excess of the maximum level of liquid to be measured, said casing structure having a liquid inlet and an interior valve seat rib formed adjacent thereto, yieldable valve means mounted in said casing and biased into cooperative relation with said valve seat for normally closing said inlet, a removable plug member coaxially engageable in the bottom opening of said casing structure, a translucent gauge tube open at both ends and carried coaxially on said plug member for insertion in telescoping relation in said tubular portion, said plug member having a port communicating with the lower opening of said gauge tube and a valve seat collar adjacent said port, yieldable valve means carried by said plug member and biased into cooperative relation with said seat collar for normally closing said port when said plug member is separated from said casing structure, the last-named valve means being engageable with said seat rib of the casing for opening said port when said plug member is axially assembled thereon, and said seat collar being at the same time engageable with the first-named valve means for opening said liquid inlet in the casing structure.

3. A liquid level indicator assembly comprising cylindrical casing having a bottom opening and carrying an upright tubular portion having a height in excess of the maximum level of liquid to be measured, said casing having a liquid inlet, yieldable valve means mounted in said casing adjacent said inlet and biased toward a seating face for closing said inlet, a removable plug member coaxially engageable in said bottom opening of the casing, a translucent gauge tube having a lower open end mounted on said plug member and an upper open end adapted to be disposed adjacent the top of said tubular portion of the casing upon engagement of said plug member in said bottom opening, said plug member having a port communicating with the lower opening of said gauge tube, yieldable valve means disposed on said plug member adjacent said port and biased toward a seating face for closing said port, operating means carried in said casing for cooperative alignment with the last-named valve means, and operating means carried on said plug member for cooperative alignment with the first-named valve means in the casing, both said operating means being brought into operative engagement with the respective valve means for effecting the opening of said inlet and said port upon assembly of said plug member with said casing.

4. The combination with a reservoir of a liquid level gauge device accessible from a point below the reservoir and comprising a vertically disposed generally cylindrical casing secured in an opening formed in the bottom of said reservoir and having a portion extending upwardly above the level of liquid therein, a plug member movably engageable in said casing and carrying a transparent tube adapted to extend into said upper portion and having openings for receiving liquid at the same level as that in said reservoir, a valve in said casing for preventing escape of liquid from said reservoir upon removal of said plug member from said casing, a valve carried by said plug member for preventing escape of liquid from said tube upon removal of said plug member from the casing, and means for holding both said valves open when said plug member is engaged in said casing.

5. The combination with a cylindrical casing having a vertical axis and forming a liquid receiving chamber and an inlet through which liquid under a limited pressure head may be admitted to the chamber, of a removable gauge unit accessible from a point below said casing and engageable in the lower end thereof, said gauge unit including an upright translucent level indicating tube having an opening for admitting liquid to a level corresponding to the pressure head thereof, valve means including a yieldable closure element biased to close said inlet and adapted to be held open by said gauge unit for permitting flow of liquid through said inlet when said unit is engaged in said casing, and other valve means carried by said gauge unit and including a yieldable closure element engageable with said casing and biased for closing said opening in the tube upon disengagement of said unit from said casing.

THOMAS B. DARLINGTON.

REFERENCES CITED

The following references are of record in the file of this patent:

UNITED STATES PATENTS

| Number | Name | Date |
|---|---|---|
| 1,979,705 | Raymond | Nov. 6, 1934 |
| 2,333,711 | Dwiggins | Nov. 9, 1943 |
| 2,505,916 | Salvessen | May 2, 1950 |